(12) United States Patent
Lucassen et al.

(10) Patent No.: US 12,490,357 B2
(45) Date of Patent: Dec. 2, 2025

(54) LIGHT GENERATING SYSTEM

(71) Applicant: SIGNIFY HOLDING B.V., Eindhoven (NL)

(72) Inventors: Marcel Petrus Lucassen, Landsmeer (NL); Marcus Theodorus Maria Lambooij, Eindhoven (NL); Cornelis Teunissen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 78 days.

(21) Appl. No.: 18/691,287

(22) PCT Filed: Sep. 9, 2022

(86) PCT No.: PCT/EP2022/075079
§ 371 (c)(1),
(2) Date: Mar. 12, 2024

(87) PCT Pub. No.: WO2023/041426
PCT Pub. Date: Mar. 23, 2023

(65) Prior Publication Data
US 2024/0381503 A1    Nov. 14, 2024

(30) Foreign Application Priority Data
Sep. 14, 2021   (EP) .................................... 21196571

(51) Int. Cl.
*H05B 45/22* (2020.01)
*H05B 45/12* (2020.01)
(Continued)

(52) U.S. Cl.
CPC ............. *H05B 45/22* (2020.01); *H05B 45/12* (2020.01); *H05B 47/105* (2020.01); *H05B 47/155* (2020.01)

(58) Field of Classification Search
CPC .................. H05B 45/10–28; H05B 47/10–155
See application file for complete search history.

(56) References Cited

U.S. PATENT DOCUMENTS

| | | | |
|---|---|---|---|
| 2012/0008318 A1* | 1/2012 | Ishiwata | ................ H05B 45/20 362/231 |
| 2015/0162505 A1 | 6/2015 | Jones | |

(Continued)

FOREIGN PATENT DOCUMENTS

| | | |
|---|---|---|
| AU | 2020104402 A4 | 3/2021 |
| EP | 2469983 A2 | 6/2012 |

*Primary Examiner* — Jason M Han

(57) ABSTRACT

The invention provides a light generating system (1000) configured to generate in a first operational mode of the light generating system (1000) system light (1001), wherein: the system light (1001) in the first operational mode has a spectral power distribution with at least 85% of the spectral power in three emission bands (111,121,131) comprising (i) a first emission band (111) having a centroid wavelength of 445 nm +/−25 nm and having a full width half maximum of at maximum 25 nm, (ii) a second emission band (121) having a centroid wavelength of 541 nm +/−25 nm and having a full width half maximum of at maximum 150 nm, and (iii) a third emission band (131) having a centroid wavelength of 614 nm +/−25 nm and having a full width half maximum of at maximum 25 nm; in the first operational mode the light generating system (1000) is configured to control the spectral power distribution of the system light (1001) in dependence of a radiant flux of the system light (1001) while maintaining a correlated color temperature of the system light (1001) within +/−10% of a predetermined correlated color temperature value; and in the first operational mode the light generating system (1000) is configured to shift a color point (1010) of the system light (1001) towards a lower $D_{uv}$ with decreasing radiant flux of the system light (1001) or to shift the color point (1010) of the (Continued)

system light (1001) towards a higher $D_{uv}$ with increasing the radiant flux of the system light (1001).

15 Claims, 4 Drawing Sheets

(51) Int. Cl.
*H05B 47/105* (2020.01)
*H05B 47/155* (2020.01)

(56) References Cited

U.S. PATENT DOCUMENTS

| | | |
|---|---|---|
| 2016/0195227 A1 | 7/2016 | Rooijmans |
| 2016/0308097 A1 | 10/2016 | Horie |
| 2017/0009131 A1 | 1/2017 | Wataya et al. |
| 2020/0351996 A1 | 11/2020 | Qiu |
| 2021/0227657 A1 | 7/2021 | Petluri et al. |

\* cited by examiner

LIGHT GENERATING SYSTEM

CROSS-REFERENCE TO PRIOR APPLICATIONS

This application is the U.S. National Phase application under 35 U.S.C. § 371 of International Application No. PCT/EP2022/075079, filed on Sep. 9, 2022, which claims the benefit of European Patent Application No. 21196571.0, filed on Sep. 14, 2021. These applications are hereby incorporated by reference herein.

FIELD OF THE INVENTION

The invention relates to a light generating system and to a light generating device comprising such light generating system.

BACKGROUND OF THE INVENTION

Light generating systems are known in the art. U.S. Pat. No. 20,151,62505A1, for instance, describes a visible light spectrum and light source apparatus that provide over 90% of their total radiant power within the 385-530 nm and the 570-820 nm spectral ranges, collectively. The objective of the light spectrum and apparatus is to improve the visibility and shape of a wider range of objects than is practical using conventional LED white light sources at similar radiant power conditions. One illustrative embodiment of this spectrum and light source provides a full visible light spectrum with at least 6% of the highest peak radiant power of all wavelengths between 405 nm-730 nm, and another illustrative embodiment provides a similar full spectrum between 440 nm and 730 nm. In both embodiments, the average radiant power in the 475-510 nm cyan spectral region is at least 2-times the average radiant power in the 530-570 nm spectral region.

US2016/308097A1 discloses a light-emitting device having as light-emitting elements, a blue semiconductor light-emitting element, a green phosphor, and a red phosphor, wherein light emitted from the light-emitting device realises a natural, vivid, highly visible and comfortable appearance of colors or an appearance of objects by adopting a spectral power distribution having a shape completely different from the shape of conventionally known spectral power distributions while maintaining favorable color appearance characteristics.

SUMMARY OF THE INVENTION

At normal outdoor and indoor light levels (photopic regime), most people have good visual acuity and color discrimination ability. It is a common and daily experience that human visual performance degrades when lowering the light/illumination level. This becomes noticeable towards the evening and night, i.e., when the intensity of natural daylight drops. At lower light/illumination levels (mesopic regime), for instance under moonlight or streetlight, the color appearance of objects may get impaired due to a reduced signal to noise ratio in cone signals (responsible for color vision) and the intrusion of rod signals (responsible for night-time achromatic vision) in color vision.

In particular, the appearance of colors along the (vertical v'-axis in the 1976 CIE u'v' chromaticity diagram) blue-yellow axis of color space may be affected more strongly than along the (horizontal u'-axis) red-green axis. Object colors located on a circle around a white point rendered at, for example, 1000 lux (i.e. having equal chroma or saturation) may end up on an ellipse when rendered at 1 lux. Hence, at 1 lux object colors may typically appear less saturated or colorful compared to the 1000 lux situation, and more strongly so along the blue-yellow axis compared to the red-green axis. The reduced color perception may contribute to unsafe situations as, for instance, the probability that a floor unevenness or a traffic participant is not spotted may be increased.

At low light levels people may thus typically have lower visual acuity and reduced color discrimination ability, which may contribute to undesirable situations of comfort and safety. These effects cannot be predicted with currently available light quality parameters (such as CRI, CCT, chromaticity coordinates), which may all be defined for photopic vision, and these effects can compromise (the feeling of) public safety. Simply increasing illumination levels would be possible, but not preferred because of energy consumption and light pollution issues.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

Hence, in a first aspect, the invention may provide a light generating system. The light generating system may be configured to generate system light in a first operational mode (of the light generating system). In the first operational mode, the system light has a spectral power distribution with at least 85% of the spectral power in three emission bands, especially in three basic wavelength ranges. The three emission bands comprise (i) a first emission band having a centroid wavelength of 445 nm +/−25 nm, and having a full width half maximum of at maximum 25 nm. The three emission bands further comprises a second emission band having a centroid wavelength of 541 nm +/−25 nm, and having a full width half maximum of at maximum 150 nm. The three emission bands further comprises a third emission band having a centroid wavelength of 614 nm +/−25 nm, and having a full width half maximum of at maximum 25 nm. In the first operational mode, the light generating system may be configured to control the spectral power distribution of the system light in dependence of a radiant flux of the system light, while maintaining a correlated color temperature of the system light within +/−10% of a predetermined correlated color temperature (CCT) value. In further embodiments, in the first operational mode, the light generating system may be configured to shift a color point of the system light towards a lower Duv when decreasing the radiant flux of the system light and/or to shift the color point of the system light towards a higher Duv when increasing the radiant flux of the system light. The light generating system is configured to generate an illuminance selected from an illuminance range of at most 50 lux at a predetermined distance (d1) of a light emitting surface of the light generating system, wherein the predetermined distance (d1) is selected from the range of at most 20 m, and the system light comprising white light having a correlated color temperature in the range of 1800-6500 K.

In particular, the light generating system of the invention may (partially) compensate for the loss in vision performance at decreased radiant fluxes, without increasing the light level. This may be achieved by adjusting the spectral power distribution of the illumination along with the illumination level. In particular, the spectral composition may be changed to (at least partially) preserve the color gamut of object colors rendered at low lighting intensity. Hence, the invention may facilitate maintaining the color gamut at a lower illumination level, which may be beneficial not only with respect to mesopic lighting conditions but, for example, also for energy-saving applications.

Further, in embodiments (see below), the invention may facilitate increasing the color gamut at a given illumination level. Hence, the invention may facilitate providing a higher visual acuity and color discrimination, essentially without additional energy expenditure.

In an embodiment, the system light has a spectral power distribution with at least 90% of the spectral power in three emission bands and/or the second emission band having a centroid wavelength of 541 nm +/−25 nm and having a full width half maximum of at maximum 150 nm. In an embodiment, the system light has a spectral power distribution with at least 95% of the spectral power in the three emission bands.

In an embodiment, the light generating system is configured to generate an illuminance selected from an illuminance range of at most 40 lux, preferable at most 30 lux, more preferably at most 25 lux, at a predetermined distance of a light emitting surface of the light generating system.

In an embodiment, the predetermined distance is selected from the range of at most 15 meters, preferably at most 13 meters, more preferably at most 10 meters.

In specific embodiments, the invention may provide a light generating system configured to generate system light in a first operational mode, wherein in the first operational mode: the system light has a spectral power distribution with at least 85% of the spectral power in three emission bands comprising (i) a first emission band having a centroid wavelength of 445 nm +/−25 nm and having a full width half maximum of at maximum 25 nm, (ii) a second emission band having a centroid wavelength of 541 nm +/−25 nm and having a full width half maximum of at maximum 150 nm, and (iii) a third emission band having a centroid wavelength of 614 nm +/−25 nm and having a full width half maximum of at maximum 25 nm; the light generating system is configured to control the spectral power distribution of the system light in dependence of a radiant flux of the system light while maintaining a correlated color temperature of the system light within +/−10% of a predetermined correlated color temperature value; and the light generating system is configured to shift a color point of the system light towards a lower Duv with decreasing radiant flux of the system light or to shift the color point of the system light towards a higher Duv with increasing the radiant flux of the system light.

As indicated above, the invention may provide a light generating system configured to generate system light in a first operational mode (of the light generating system). The fact that the system may provide system light in a first operational mode, does not exclude that the system may be able to generate system light (in one or more other operational modes) not complying with the herein described conditions for the system light in the first operational mode. However, it may also be possible that the system may be operated in one or more operational modes wherein the system light always complies with the herein described conditions for the system light. In embodiments, the system may be configured to generate in one or more operational modes system light complying with the herein described conditions for the system light. In yet other specific embodiments, the system may be configured to generate in one or more operational modes system light complying with the herein described conditions for the system light, and in one or more other operational modes system light not complying with the herein described conditions for the system light.

The system, or apparatus, or device may execute an action in a "mode" or "operation mode" or "mode of operation" or "operational mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though e.g. other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In embodiments, the control system may be configured to control the spectral power distribution in dependence of a sensor signal. Alternatively or additionally, the control system may be configured to control the spectral power distribution in dependence of a user device, such as a smartphone, such as via Bluetooth.

The term "controlling" and similar terms herein may especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system. The control system and the element may thus at least temporarily, or permanently, functionally be coupled. The element may comprise the control system. In embodiments, the control system and the element may not be physically coupled. Control can be done via wired and/or wireless control. The term "control system" may also refer to a plurality of different control systems, which especially are functionally coupled, and of which e.g. one master control system may be a control system and one or more others may be slave control systems.

As indicated above, especially the system is configured to generate in an operational mode system light having a spectral power distribution with at least 75% of the spectral power in three emission bands, even more especially at least 80% of the spectral power in the three emission bands, yet even more especially at least 85% of the spectral power in the three emission bands (or even at least 90%), including 100%. Hence, up to 25%, such as up to 20%, like up to about 15% (or even up to about 10%) of the spectral power may be in another emission band, e.g. in other wavelength ranges and/or having a larger full width half maximum (FWHM)

(see also below). Here, the percentage(s) especially refer to energy units, like e.g. Watt. Further, these percentage may especially refer to the visible wavelength range.

The terms "visible", "visible light" or "visible emission" and similar terms refer to light having one or more wavelengths in the range of about 380-780 nm.

Hence, in embodiments, the spectral power distribution may have at least 75% of spectral power in the wavelength range of 380-780 nm in three emission bands, even more especially at least 80% of the spectral power, yet even more especially at least 85% (or even at least 90%), such as at least 95%, including 100%.

Hence, especially the system may be configured to generate in an operational mode system light having a spectral power distribution with at least 75%, like at least 85% (see above), of the spectral power in the emission bands, especially in three emission bands, especially relative to the total spectral power in the visible wavelength range (of 380-780 nm). Especially, in embodiments the spectral power within each of the (three) emission bands may be larger than the spectral power outside of these emission bands. Hence, especially the system may be configured to generate in an operational mode system light having a spectral power distribution with more than 80% of the spectral power (within the visible wavelength range) in the emission bands. Here, the percentage(s) (also) especially refer to energy units, like e.g. Watt.

The position of the emission bands may not be freely selectable. It surprisingly appears that there are at least two, more especially at least three, particularly beneficial wavelength ranges wherein at least two, or at least three, respectively, emission bands may beneficially be chosen.

These emission bands, which may also be referred to as "basic wavelength ranges", may comprise a first emission band, a second emission band and a third emission band. In particular, in embodiments, the (three) emission bands may consist of the first emission band, the second emission band and the third emission band.

In embodiments, the first emission band may a centroid wavelength of 445 nm +/−25 nm, i.e., a centroid wavelength selected from the range of 420-470 nm. In further embodiments, the first emission band may have a centroid wavelength of 445 +/−20 nm, such as 445 +/−15 nm, especially of 445 +/−10 nm, such as 445 +/−5 nm. In further embodiments, the first emission band may have a full width half maximum of at maximum (or "at most") 25 nm, especially at maximum 20 nm, such as at maximum 15 nm. In embodiments, the first emission band may have a full width half maximum of at least 5 nm, such as at least 10 nm, especially at least 15 nm. However, in further embodiments, the first emission band (as well as the second and/or third emission bands) may be provided by laser light sources (see below), which may have a substantially narrower emission band.

Similarly, in embodiments, the second emission band may have a centroid wavelength of 541 nm +/−25 nm, especially 541 +/−20 nm, such as 541 +/−15 nm. In further embodiments, the second emission band may have a centroid wavelength of maximum 541 +/−10 nm, such as 541 +/−5 nm. In further embodiments, the second emission band may have a full width half maximum of at maximum (or "at most") 150 nm, especially at maximum 130 nm, such as at maximum 120 nm. In embodiments, the second emission band may have a full width half maximum of at least 40 nm, such as at least 60 nm, especially at least 80 nm.

In further embodiments, the third emission band may have a centroid wavelength of 614 nm +/−25 nm, especially 614 +/−20 nm, such as 614 +/−15 nm. In further embodiments, the third emission band may have a centroid wavelength of maximum 614 +/−10 nm, such as 614 +/−5 nm. In further embodiments, the third emission band may have a full width half maximum of at maximum (or "at most") 25 nm, especially at maximum 20 nm, such as at maximum 15 nm. In embodiments, the third emission band may have a full width half maximum of at least 5 nm, such as at least 10 nm, especially at least 15 nm.

Hence, spectral power within the wavelength range of 380-780 nm, but outside the three emission bands may, in embodiments, be at maximum 25% of the total spectral power (within the 380-780 nm) wavelength range, especially at maximum 20%, yet more especially at maximum 15%. Even more especially, spectral power within the wavelength range of 380-780 nm, but outside these three emission bands may, in embodiments, be at maximum 10% of the total spectral power (within the 380-780 nm) wavelength range.

The respective emission bands (in the respective basic wavelength ranges) may especially be relatively narrow emission bands. In embodiments, one or more of the emission bands, such as two or more, especially all, have a single maximum. This will generally be the case with e.g. laser emissions. For instance, in embodiments one or more of the emission bands, such as two or more, especially all, may have a substantially Gaussian shape. However, other shapes may also be possible.

In embodiments it may also be possible that an emission band may comprise two or more overlapping (smaller) emission bands, which together form an emission band, for instance with a single maximum. This may e.g. be the case when using for instance quantum dots. In embodiments, such emission band may have a substantially Gaussian shape. However, other shapes may also be possible. In embodiments, one or more of the (four) emission bands (in the respective basic wavelength ranges) may comprise two or more overlapping (smaller) emission bands.

Yet further, in embodiments it may also be possible that in a basic wavelength range there are two or more different emission bands that (spectrally) partly overlap or that do not overlap. In such embodiments, in a basic wavelength range there may be two or more maxima. These two or more emission bands may together form the spectral power distribution of the respective basic wavelength range. In such embodiments, each of the two or more different emission bands may comply with the condition of the full width half maximum, such as of at maximum 25 nm (or less). Further, the peak maxima of the lowest energetic emission band in the basic wavelength range and the highest energetic emission band in the basic wavelength range may have a (spectral) distance of not larger than the full width half maximum, such as of at maximum 25 nm. Even more especially, at least 75% of the spectral power of the two or more different emission bands may be found within the (respective) full width half maximum wavelength range, such as within a 20 nm wavelength range, or even within a 15 nm wavelength range within the basic wavelength range. In such instance, the bands may still provide a relative narrow emission. For instance, this may be the case when using two lasers having maxima differing e.g. 10 nm from each other. In embodiments, one or more of the (three) emission bands (in the respective basic wavelength ranges) may effectively be provided by two or more partly overlapping or non-overlapping (smaller) emission bands. In other embodiments, however, one or more of the (three) emission bands (in the respective basic wavelength ranges) are provided by a single type of light source, such as two or more of the (three) emission bands (in the respective basic wavelength ranges) are each provided by a single type of light source, yet even more especially each of the (three) emission bands (in the respective basic wavelength ranges) are each provided by a single type of light source, yet even more, like e.g. three different lasers or three different superluminescent diodes, or two different lasers and a (different) superluminescent diode, etc.

Especially, the three basic wavelength ranges may be centered around about 445 nm, 541 nm, and 614 nm, respectively.

Herein, the term full width half maximum as well as the peak positions, may especially refer to the full width half maximum or peak position at maximum operation. This may e.g. be at temperatures for lasers at e.g. about 40-70° C., though other temperatures may also be possible. For luminescent materials, the temperature may be in the range of 20-200° C., though other temperatures may also be possible.

In embodiments, in the first operational mode, the light generating system may be configured to control the spectral power distribution of the system light in dependence of a radiant flux of the system light while maintaining a correlated color temperature of the system light within +/−10% of a predetermined correlated color temperature (CCT) value, such as within +/−5% of a predetermined correlated color temperature value, especially within +/−3% of a predetermined correlated color temperature value.

The term "radiant flux" may especially refer to the radiant energy emitted per unit time (by the light generating device). Instead of the term "radiant flux", also the terms "intensity" or "radiant power" may be applied. The term "radiant flux" may have as unit an energy, like especially Watts. The term "spectral power distribution" especially refers to the power distribution of the light (especially in Watts) as function of the wavelength (especially in nanometers), especially in embodiments over the human visible wavelength range (380-780 nm). Especially, the term "spectral power distribution" may refer to a radiant flux per unit frequency or wavelength, often indicated in Watt/nm. Instead of the term "spectral power distribution" also the term "spectral flux" may be applied. Hence, instead of the phrase "controllable spectral power distribution", also the phrase "controllable spectral flux" may be applied. The spectral flux may be indicated as power (Watt) per unit frequency or wavelength. Especially, herein the spectral flux is indicated as the radiant flux per unit wavelength (W/nm). Further, herein spectral fluxes and radiant fluxes are especially based on the spectral power of the device light over the 380-780 nm wavelength range.

The term "correlated color temperature" may herein especially refer to the temperature of a Planckian radiator having the chromaticity nearest the chromaticity associated with the given spectral distribution on a modified 1976 UCS diagram where u', 2/3v' are the coordinates of the Planckian locus and the test stimulus.

In embodiments, the correlated color temperature of the system light may be controllable within the range of 1800-6500 K, especially within the range of 2000-6500 K, such as within the range of 2200-4000 K. Hence, in embodiments, the system light may have a CCT of at least 1800 K, especially at least 2000 K, such as at least 2200 K. In further embodiments, the system light may have a CCT of at most 6500 K, such as at most 4000 K. In particular, in embodiments, in the first operational mode the predetermined correlated color temperature (of the system light) may be selected from the range of 1800-6500 K. especially from the range of 2000-6500 K, such as from the range of 2200-4000 K 2200-4000 K. Hence, in embodiments, the predetermined CCT may be at least 1800 K. especially at least 2000 K, such as at least 2200 K. In further embodiments, the predetermined CCT may be at most 6500 K, such as at most 4000 K. Hence, in embodiments, in the first operational mode the light generating system may be configured to select the predetermined correlated color temperature (of the system light) from the range of 1800-6500 K, especially from the range of 2000-6500 K, such as from the range of 2200-4000 K.

In further embodiments, the light generating system may be configured to control the spectral power distribution of the system light in dependence of a radiant flux of the system light while maintaining a correlated color temperature within a color area, such as within a color area a nominal CCT category in an ANSI binning standard. In particular, the color area may be defined by (a) the four corners for a 7-step quadrangle in the basic specification and (b) the four corners for a (corresponding) 7-step quadrangle in the extended specification for the predetermined correlated color temperature, especially wherein the 7-step quadrangles and the predetermined correlated color temperature are defined according to ANSI C78.377-2017 Tables 1 & A1 for the basic specification and Tables 2 & E1 for the extended specification.

Hence, the light generating system may be configured to adjust the spectral power distribution along with adjusting the radiant flux, while remaining "close" to a predetermined correlated color temperature, especially while remaining within a color area as defined according to an ANSI standard, such as defined according to ANSI C78.377-2017 Tables 1 & A1 (for the basic specification) and Tables 2 & E1 (for the extended specification).

As indicated above, in the first operational mode, the light generating system may be configured to change the Duv along with the radiant flux of the system light, such as increasing the Duv with increasing radiant flux. Further, as also indicated above, the light generating system may be configured to maintain the correlated color temperature within a color area.

Hence, in further embodiments, in the first operational mode the light generating system may be configured to shift a color point of the system light and to change the radiant flux of the system light between a first setting and a second setting, especially from the first setting to the second setting, or especially from the second setting to the first setting. Especially, the first setting may have a first color point of the system light within the four corners of the 7-step quadrangle in the basic specification for the predetermined correlated color temperature and a first radiant flux I1. Similarly, the second setting may especially have a second color point of the system light within the four corners of the (corresponding) 7-step quadrangle in the extended specification for the predetermined correlated color temperature and a second radiant flux I2.

In particular, the second radiant flux I2 may be smaller than the first radiant flux I1, i.e., I2<I1. Especially, in embodiments I2/I1 ≤0.99, such as ≤0.95, especially ≤0.90. In further embodiments, I2/I1 ≤0.85, especially ≤0.8, such as ≤0.7. It will be clear to the person skilled in the art that the extent to which the radiant flux can be decreased while maintaining the color gamut by shifting the Duv will be limited. In particular, the radiant flux decrease that may be compensated by the Duv shift may depend on various factors, such as the CCT (also see FIG. 3A-F). Hence, in embodiments, I2/I1 ≥0.2, such as ≥0.24, especially ≥0.3. For instance, in specific embodiments, the Duv may be selected from the range of $0.24 \le I2/I1 \le 0.9$.

In embodiments, in the first operational mode the light generating system may be configured to shift a color point of the system light towards a lower Duv with decreasing radiant flux of the system light, and/or to shift the color point of the system light towards a higher Duv with increasing the radiant flux of the system light. Hence, in the first operational mode, the light generating system may be configured to increase (or "decrease") the color point of the system light with respect to Duv when increasing (or "decreasing") the radiant flux (of the system light).

The term "Duv" (or "Delta u,v") may herein refer to a distance of a light color point from the black body locus (BBL), as defined in CIE 015:2018, Colorimetry, 4th Edition, which is hereby herein incorporated by reference. In particular, a negative Duv may indicate that the color point is below the BBL, wherein a more negative value indicates a point farther below the black body curve, whereas a positive Duv may indicate that the color point is above the BBL, wherein a more positive value indicates a point farther above the black body curve. Hence, the term "Duv" is known in the art. As indicated e.g. on https://www.waveformlighting.com/tech/calculate-duv-from-cie-1931-xy-coordinates, "Duv is a metric that is short for "Delta u,v" and describes the distance of a light color point from the black body curve. It is typically used in conjunction with a correlated color temperature (CCT) value in explaining how close to the black body curve ("pure white") a particular light source is. A negative value indicates that the color point is below the black body curve (magenta or pink) and a positive value indicates a point above the black body curve (green or yellow). A more positive value indicates a point farther above the black body curve, while a more negative value indicates a point farther below the black body curve. In short, Duv conveniently provides both magnitude and directional information about a color point's distance from the black body curve". At this site, Duv values may also be calculated.

In embodiments, the system light may comprise white light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

As described above, in the first operational mode, the light generating system may preserve the color gamut at low lighting levels. The term "color gamut" may herein especially refer to the subset of object colors in a color space that may be reached with a specific light generating device (or light generating system).

As will be known to the person skilled in the art, also other measures, such as the color rendering index (CRI), are available for evaluating the ability of a light source to reveal different colors. In practice, and especially at mesopic light levels, it appears that the color gamut is more representative than the CRI for predicting color discrimination on standardized Farnsworth-Munsell 100 Hue tests and that color gamut is predictive of color saturation. Hence, the light generating system of the invention may primarily be configured to preserve color gamut, rather than CRI.

Regardless, in embodiments, in the first operational mode the light generating system may be configured to maintain a color rendering index, especially a CRI $R_a$, of the system light of at least 70, such as at least 80, especially at least 90.

As described above, the light generating system may in a first operational mode facilitate maintaining the color gamut while reducing the radiant flux, but may also in a second operational mode increase the color gamut while maintaining the radiant flux.

Hence, in embodiments, the light generating system, especially the control system, may further have a second operational mode. In the second operational mode, the light generating system may be configured to shift a color point of the system light between a first setting and a second setting, especially while maintaining the radiant flux of the system light essentially constant, such as wherein $0.95 \le I2/I1 \le 1.05$, especially wherein $0.97 \le I2/I1 \le 1.03$. In the first setting the system light may have a first color point within the four corners of the 7-step quadrangle in the basic specification for the predetermined correlated color temperature according to ANSI C78.377-2017 and a first radiant flux I1. In the second setting the system light may have a second color point within the four corners of the 7-step quadrangle in the extended specification for the predetermined correlated color temperature according to ANSI C78.377-2017 and a second radiant flux I2. In particular, in embodiments, the light generating system may especially be configured to shift the color point from the first setting to the second setting, or especially from the second setting to the first setting.

In further embodiments, in the second operational mode, the light generating system may be configured to shift a color point of the system light from (i) a first setting with a color point of the system light within the four corners of the 7-step quadrangle in the basic specification for the predetermined correlated color temperature according to ANSI C78.377-2017 and a first radiant flux I1, to (ii) a second setting with a color point of the system light within the four corners of the 7-step quadrangle in the extended specification for the predetermined correlated color temperature according to ANSI C78.377-2017 and a second radiant flux I2, or from the second setting to the first setting, especially while maintaining the radiant flux of the system light essentially constant, such as wherein $0.95 \le I2/I1 \le 1.05$.

To provide the system light, the system may comprise a plurality of sources of light. In embodiments, different light sources are applied, especially laser light sources. In (other) embodiments, one or more narrow band emission materials may be applied, which may optionally be comprised in a single light source. Such single light source may thus be a source of a single type of light in a single basic wavelength range, or of more than one type of light in two or more different basic wavelength ranges. Hence, in embodiments the system may comprise three sources of light configured to generate the (respective) emission bands.

Hence, in embodiments, the light generating system may comprise three sources of light configured to generate the emission bands. Especially, a first source of light (or "first light source") (of the three sources of light) may be configured to generate (at least part of) the first emission band. Similarly, a second source of light (or: "second light source") (of the three sources of light) may be configured to generate (at least part of) the second emission band. In embodiments, the third source of light (or: "third light source") (of the three sources of light) may be configured to generate (at least part of) the third emission band.

In further embodiments, the three sources of light may be configured to generate at least 85% of the spectral power of the system light, such as in the visible range, especially in the first operational mode, or especially in the second operational mode.

In further embodiments, the first source of light and the third source of light may each be individually selected from the group of laser light sources, superluminescent diodes, and quantum structure based light sources. In further embodiments, the second source of light may comprise a phosphor converted solid state light source configured to generate the second emission band.

Here below, some further aspects in relation to light sources (or "sources of light") are described. In particular, the term "light source" may especially refer to any one of the first source of light, the second source of light and the third source of light.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be an outer surface of the glass or quartz envelope. For LEDs it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

The term "light source" may refer to a semiconductor light-emitting device. such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid-state light source (such as a LED or laser diode). In embodiments, the term "laser" may refer to a multimode laser diode. In other embodiments, the term "laser" may refer to a single mode laser diode. In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

Hence, in embodiments, the light generating system may comprise a plurality of (different) first sources of light together providing the first emission band. Similarly, in embodiments, the light generating system may comprise a plurality of (different) second sources of light together providing the second emission band. In further embodiments, the light generating system may comprise a plurality of (different) third sources of light together providing the third emission band.

In further embodiments, the light generating system may comprise three different sources of light, especially comprising a plurality of (essentially) same first sources of light, especially comprising a plurality of (essentially) same second sources of light, and especially comprising a plurality of (essentially) same third sources of light.

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may, in embodiments, be comprised by the light source, such as a LED with a luminescent material layer or dome comprising luminescent material. Such LEDs may be indicated as phosphor converted LEDs or PC LEDs. In other embodiments, the luminescent material may be configured at some distance ("remote") from the light source, such as a LED with a luminescent material layer not in physical contact with a die of the LED. Hence, in specific embodiments the light source may be a light source that during operation emits at least light at a wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce: LiSAF, Ce:LiCAF), chromium doped chrysoberyl (alexandrite) laser, chromium ZnSe (Cr:ZnSe) laser, divalent samarium doped calcium fluoride (Sm:CaF$_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:YCa$_4$O (BO$_3$)$_3$ or Nd:YCOB, neodymium doped yttrium orthovanadate (Nd:YVO$_4$) laser, neodymium glass (Nd:glass) laser, neodymium YLF (Nd: YLF) solid-state laser, promethium 147 doped phosphate glass (147Pm$^{3+}$:glass) solid-state laser, ruby laser (Al$_2$O$_3$: Cr$^{3+}$), thulium YAG (Tm:YAG) laser, titanium sapphire (Ti:sapphire:Al$_2$O$_3$:Ti$^{3+}$) laser, trivalent uranium doped calcium fluoride (U:CaF$_2$) solid-state laser, Ytterbium doped glass laser (rod, plate/chip, and fiber), Ytterbium YAG (Yb:YAG) laser, Yb$_2$O$_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths. To contain upconversion or downconversion, also non-linear optics may be applied. Further, also an OPA (optical parametric amplifier) may be applied, such as to create the desired wavelengths and/or wavelength distributions, on the basis of another light source, such as a laser light source.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source may be configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source is especially configured to generate light source light having an optical axis (O), (a beam shape,) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term "solid state light source", or "solid state material light source", and similar terms, may especially refer to semiconductor light sources, such as a light emitting diode (LED), a diode laser, or a superluminescent diode.

In specific embodiments, the light generating device may comprise a plurality of different light sources, such as two or more subsets of light sources, with each subset comprising one or more light sources configured to generate light source light having essentially the same spectral power distribution, but wherein light sources of different subsets are configured to generate light source light having different spectral distributions. In such embodiments, a control system may be configured to control the plurality of light sources. In specific embodiments, the control system may control the subsets of light sources individually.

In specific embodiments one or more of the three sources of light may comprise laser light sources. More especially, in embodiments two or more of the three sources of light comprise laser light sources, yet even more especially all of the three sources of light comprise laser light sources. Note that the term "laser light source" may in embodiments refer to a plurality of laser light sources of the same bin. However, in other embodiment the term "laser light source" may also refer to a plurality of (slightly) different laser light sources (such as with peak maxima of the lowest energetic emission band in the basic wavelength range and the highest energetic emission band in the basic wavelength range may have a (spectral) distance of not larger than the full width half maximum of at maximum 25 nm; see further above).

Instead of or in addition to laser light sources, also quantum structure based light sources may be used. Quantum structure based light sources may comprise light sources that use the quantum structure as primary source of light, like a quantum dot laser. Alternatively or additionally, quantum structure based light sources may comprise light sources that use the quantum structure as secondary source of light. In such embodiments, a (primary) light source may generate light source light that is at least partly converted by the quantum structure into converted light. In such embodiments, the quantum structure is used as luminescent material. Hence, the term "phosphor" may also refer to a quantum structure (that may be used as luminescent material).

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise up-converter luminescent material, i.e. radiation of a larger wavelength is converted into radiation with a smaller wavelength ($\lambda_{ex} > \lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, quantum structures may comprise 2D or 3D arrangements of structures or matter, thereby providing the quantum structure(s), as known in the art. Further, in embodiments quantum structures may comprise semiconductor nanoparticles, such as quantum dots, as known in the art (see e.g. WO2013150455 or WO2013057702).

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

For instance, in embodiments one or more of the three sources of light comprise quantum structure based light sources. Especially, in embodiments one or more of the three sources of light comprise quantum dot based light sources, like a laser light source with quantum dots as luminescent material, which convert at least part of the laser light into (quantum dot) luminescent material light.

As indicated above, in embodiments the system may comprise three sources of light configured to generate the (respective) emission bands.

In a first extreme case, the three sources of light may be based on a single type of light source which emits one or more (broad bands). Together with optics, the (three) emission bands may be selected. In a second similar extreme, the three sources of light may be based on a single type of light source which emits the (three) emission bands having the desired band widths ("emission band width") and in the desired basic wavelength ranges ((three) sources of light). For instance, a light source may be used, configured to generate light source light, of which at least part is converted into luminescent material light. This may provide, optionally in combination with (first) optics, to the (three) emission bands. For purposes of controllability of the spectral power distribution, a type of light source, optionally in combination with first optics, may essentially provide not more than two of the sources of light.

In yet a third (differently) extreme case, (three) different light sources provide (optionally together with first optics) the respective (three) emission bands having the desired band widths and in the desired basic wavelength ranges (of the (three) sources of light). This may provide a maximum controllability of the system light. Note that such sources of light may be based on conversion or may not be based on conversion. For instance, one or more sources of light may selected from the group comprising a laser diode, a quantum-structure based light source. In embodiments, one or more light sources may be based on a conversion of luminescent material light with one or more f-f transitions of a (trivalent) lanthanide ion, optionally in combination with first optics to filter out undesired (f-f transitions).

Hence, especially the light generating system may comprise two or more different types of light sources (optionally in combination with a luminescent material and/or first optics) which are configured as respective source of light. Hence, especially there may be three different light sources, which optionally in combination with a luminescent material and/or first optics, are configured as respective source of light of the three sources of light. The (three) light sources may individually be controlled by a control system (see also elsewhere herein). The phrase "different light sources", and similar phrases, may refer to light sources that generate light source light having different spectral power distribution but may also refer to light sources that generate light source light having essentially the same spectral power distribution, but which are used for different sources of light, like e.g. a blue laser diode for the blue component, and the same type blue for a red component as the blue laser light is converted by a luminescent material into red luminescence.

Would a source of light have a too broad emission band width and/or a less desirable spectral power distribution, it may be possible to use optics to modify the spectral power distribution of the source of light (see also above). For instance, one or more of a grating, a bandpass filter, a dichroic filter, a monochromatic filter, a longpass filter, a shortpass filter, a dispersion element (like a prism) (with an optics e.g. a slit, to select the desired wavelengths (like in monochromators) etc. Such optics are herein indicated as "first optics". One or more, such as two or more of such (first) optics may be applied. In embodiments, the first optics may be configured to narrow the beam width of the respective source of light. Note that the term "first optics" may also refer to a plurality of (such) optics.

Hence, instead of sources of light that may have a relative narrow band by nature, such as can be the case with lasers and quantum dots, also other sources of light may be applied, which, together with the first optics, may provide a source of light having a suitable spectral power distribution (including in embodiments the desired band width). Likewise, instead of sources of light that may have the spectral power distribution at about the right position, also other sources of light may be applied, which, together with the first optics, may provide a source of light having a suitable spectral power distribution (including in embodiments within one of the indicated basic wavelength range).

In embodiments, also one or more LEDs, or phosphor converted LEDs, or superluminescent diodes, may be applied. Especially, in embodiments of the light generating system one or more of the three sources of light comprise a light source selected from a LED, a phosphor converted LED, and a superluminescent diode, optionally in combination with first optics, wherein the first optics are configured to narrow the beam width of the respective source of light.

Hence, for instance as source of light a narrow-band LED may be applied but also a broad-band LED with one or more additional optical filters (to narrow down the emission spectrum) may be applied.

With above-mentioned sources of light, it may be possible to provide in embodiments three emission bands which may have relatively narrow band widths.

In specific embodiments, the system may comprise one or more of (a) a first source of light configured to generate the first emission band having a centroid wavelength selected from the wavelength range of 420-470 nm, (b) a second source of light configured to generate the second emission band having a centroid wavelength selected from the wavelength range of 515-565 nm, and (c) a third source of light configured to generate the third emission band having a centroid wavelength selected from the wavelength range of 590-640 nm.

The term "centroid wavelength", also indicated as $\lambda_c$, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c = \Sigma \lambda * I(\lambda)/(\Sigma I(\lambda))$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at (maximum) operation conditions.

The system may further comprise optics (see also above). The term "optics" may especially refer to (one or more) optical elements. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term "optics" may refer to a holographic element or a mixing rod. In embodiments, the optics may include one or more of beam expander optics and zoom lens optics. See further above for examples of optics.

Especially, the system may comprise optics to combine the light of different sources of light (when these are spatially separated generated). Hence, two or more beams of different sources may be combined into a single beam using optics. Such optics are herein indicated as "second optics". One or more, such as two or more of such (second) optics may be applied. Note that when quantum structures are applied, such optics or less of such second optics may be necessary, as e.g. a single light source may provide two sources of light (e.g. two different types of quantum dots emitting in different basic wavelength ranges). In embodiments, the second optics may be selected from the group of a dichroic mirror, a dichroic cube, and a diffractive optical element. Optionally, the second optics maybe provided using a holographic element. Yet, alternatively or additionally, the second optics may comprise a polarization beam combiner, a mixing rod, a light pipe, a light guide, etc. Especially, the dichroic element may be a dichroic mirror or reflector. Hence, in embodiments the light generating system may further comprise second optics, configured to combine two or more beams of light of two or more of the four sources of light.

Especially, the system is configured to generate system light. In embodiments, the system light may escape from the system as a beam of light. Further, in embodiments the system may comprise optics which are configured downstream of the sources of light, and which optics may e.g. be configured to shape the beam of light and/or to mix the different sources of light. Such optics are herein indicated as "third optics". One or more, such as two or more of such (third) optics may be applied. Hence, in embodiments the light generating system may further comprise third optics configured downstream of the sources of light, wherein the third optics may comprise a beam shaping element selected from the group of diffusors and collimators, or other optical elements, such as comprising lenses, reflectors, etc. (see also above). In embodiments, the third optics may comprise one or more of beam expander optics and zoom lens optics. Third optics may e.g. be applied to mix beams of light.

Further, the spatial power distribution, the angular distribution, and the color homogeneity may be influenced with the third optics.

Note that the terms "second optics" and "third optics" may each individually also refer to a plurality of (such) optics.

Hence, in embodiments the light generating system may further comprise second optics, configured to combine two or more beams of light of two or more of the four sources of light, and third optics configured downstream of the sources of light, wherein the third optics comprises a beam shaping element selected from the group of diffusors and collimators.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In embodiments, the light generating system may further comprise a control system. The control system may especially have the first operational mode and/or the second operational mode. In particular, in embodiments, the control system may be configured to (have the light generating system) execute the first operational mode. Similarly, in further embodiments, the control system may be configured to (have the light generating system) execute the second operational mode.

In further embodiments, the control system may especially be configured to control one or more of the spectral power distribution, the color rendering index, the color point, and the correlated color temperature of the system light in dependence of one or more of (i) a sensor signal of a sensor, especially wherein the sensor comprises an optical sensor, (ii) an input signal of a user interface, and (iii) a timer.

For instance, in embodiments, the sensor may be configured to detect an (ambient) illuminance level and to provide a related sensor signal to the control system. The control system may be configured to control one or more of the spectral power distribution, the color rendering index, the color point, and the correlated color temperature of the system light in dependence of the sensor signal.

Similarly, in embodiments, control system may be configured to control one or more of the spectral power distribution, the color rendering index, the color point, and the correlated color temperature of the system light in dependence of a timer, such as by controlling the one or more of the spectral power distribution, the color rendering index, the color point, and the correlated color temperature of the system light based on a predetermined time schedule, especially in view of the (ambient) lighting at different times of day.

The term "related sensor signal" may herein refer to a signal that is related to the detected parameter, such as the detected (ambient) illuminance level. In particular, the related sensor signal may comprise raw and/or processed data related to the (detected) parameter.

As described above, the system light may have a spectral power distribution. In specific embodiments, the spectral power distribution may be controllable. To this end, there may be at least one source of light that is controllable, especially two or more sources of light that are controllable. Hence, in embodiments one or more of the sources of light may be controllable, especially two or more sources of light may be individually controllable. Especially, all (available) sources of light may be (individually) controllable. In this way, e.g. one or more of the spectral power distribution, the color rendering index, the color point, and the correlated color temperature of the system light may be controllable. Therefore, especially, the light generating system may (further) comprising a control system. In embodiments, the control system may be configured to control one or more of the spectral power distribution, the color rendering index, the color point, and the correlated color temperature of the system light, especially by controlling the (three) sources of light. In particular, in embodiments, the control system may be configured to control the (three) sources of light.

In further embodiments, the control system may be configured to control one or more of the spectral power distribution, the color rendering index, and the color point, of the system light while maintaining the correlated color temperature within a range of 2200-6500 K.

For instance, in embodiments the control system is configured to control one or more of the spectral power distribution, the color rendering index, and the color point, of the system light while maintaining the correlated color temperature within a range of 1800-6500 K, such as 2000-6500 K, like especially about 2700-6500 K. In (other) embodiments, embodiments the control system is configured to control one or more of the spectral power distribution, the correlated color temperature, and the color point, of the system light while maintaining the color rendering index at least 75, more especially at at least 80, such as in specific embodiments at at least 85. Especially, in embodiments the CCT may be controllable over a range of at least 500 K, such as at least 1000 K, even more especially at least 2000 K, yet even more especially at least 3500 K, such as in specific embodiments over the entire range of 2700-6500 K.

Especially, in embodiments, the control system may be configured to control one or more of the spectral power distribution, the color rendering index, the color point, and the correlated color temperature of the system light in dependence of a sensor signal of a sensor, wherein the sensor comprises an optical sensor. The optical sensor may comprise one or more photodiodes, optionally in combination with (different) optical filters upstream of the one or more photodiodes. In embodiments, the sensor may include a monochromator, to sense a specific wavelength.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the light generating system, but may be (temporarily) functionally coupled to the light generating system.

Hence, in embodiments the control system may (also) be configured to be controlled by an App on a remote device. In such embodiments the control system of the light generating system may be a slave control system or control in a slave mode. For instance, the light generating system may be identifiable with a code, especially a unique code for the respective light generating system. The control system of the light generating system may be configured to be controlled by an external control system which has access to the light generating system on the basis of knowledge (input by a user interface of with an optical sensor (e.g. QR code reader) of the (unique) code. The light generating system may also comprise means for communicating with other systems or devices, such as on the basis of Bluetooth, WIFI, LiFi, ZigBee, BLE or WiMAX, or another wireless technology.

In specific embodiments, the light generating system may be configured to generate white system light in the first operational mode (or "second operational mode). As indicated above, e.g. the CCT of the white system light may (in embodiments) be controllable.

In a further aspect, the invention may provide a light generating device. The light generating device may especially comprise the light generating system according to the invention.

In embodiments, the light generating device may especially be selected from the group of a lamp and a luminaire, especially a lamp, or especially a luminaire. The luminaire may further comprise a housing, optical elements, louvres, etc. etc . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein.

Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, (a disinfection device, and an optical wireless communication device), comprising the light generating system as defined herein. The light generating device may comprise a housing or a carrier, configured to house or support, one or more elements of the light generating system. For instance, in embodiments the light generating device may comprise a housing or a carrier, configured to house or support one or more of a light source, optics, a controller, etc.

In embodiments, the light generating device may especially comprise a street light generating device. In further embodiments, the light generating device is configured to generate in an operational mode an illuminance selected from an illuminance range of 3-30 lux, especially from an illuminance range of 5-20 lux, at a predetermined distance d1 of a light emitting surface of the light generating device. The predetermined distance d1 may especially be selected from the range of 2.5-20 m, such as 3.5-16 (like 3.5-15 m), such as from the range of 4-10 m. In further embodiments, the illuminance may be controllable over at least part of the illuminance range.

In further embodiments, the light generating device may comprise an indoor light generating device, especially wherein the light generating device is configured to generate in an operational mode an illuminance selected from an illuminance range of 5-50 lux, such as from the illuminance range of 8-40 lux, at a predetermined distance d1 of a light emitting surface of the light generating device. In further embodiments, the predetermined distance d1 may be selected from the range of 2.0-11 m, such as from the range of 3-6 m. Especially, the illuminance may be controllable over at least part of the illuminance range.

Hence, in embodiments, the illuminance may be at least 1 lux, especially at least 2 lux, such as at least 3 lux, at the predetermined distance d1. In further embodiments, the illuminance may be at least 5 lux, especially at least 7 lux, such as at least 10 lux, at the predetermined distance d1. In further embodiments, the illuminance may be at most 50 lux, especially at most 40 lux, such as at most 30 lux, at the predetermined distance d1. In further embodiments, the illuminance may be at most 20 lux, especially at most 15 lux, such as at most 10 lux, at the predetermined distance d1.

In further embodiments, the predetermined distance d1 may be at least 1 m, such as at least 2 m, especially at least 3 m. In further embodiments, the predetermined distance d1 may be at least 5 m, especially at least 7 m, such as at least 10 m. In further embodiments, the predetermined distance d1 may be at most 20 m, such as at most 15 m, especially at most 12 m. In further embodiments, the predetermined distance d1 may be at most 10 m, such as at most 8 m, especially at most 6 m, such as at most 4 m.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
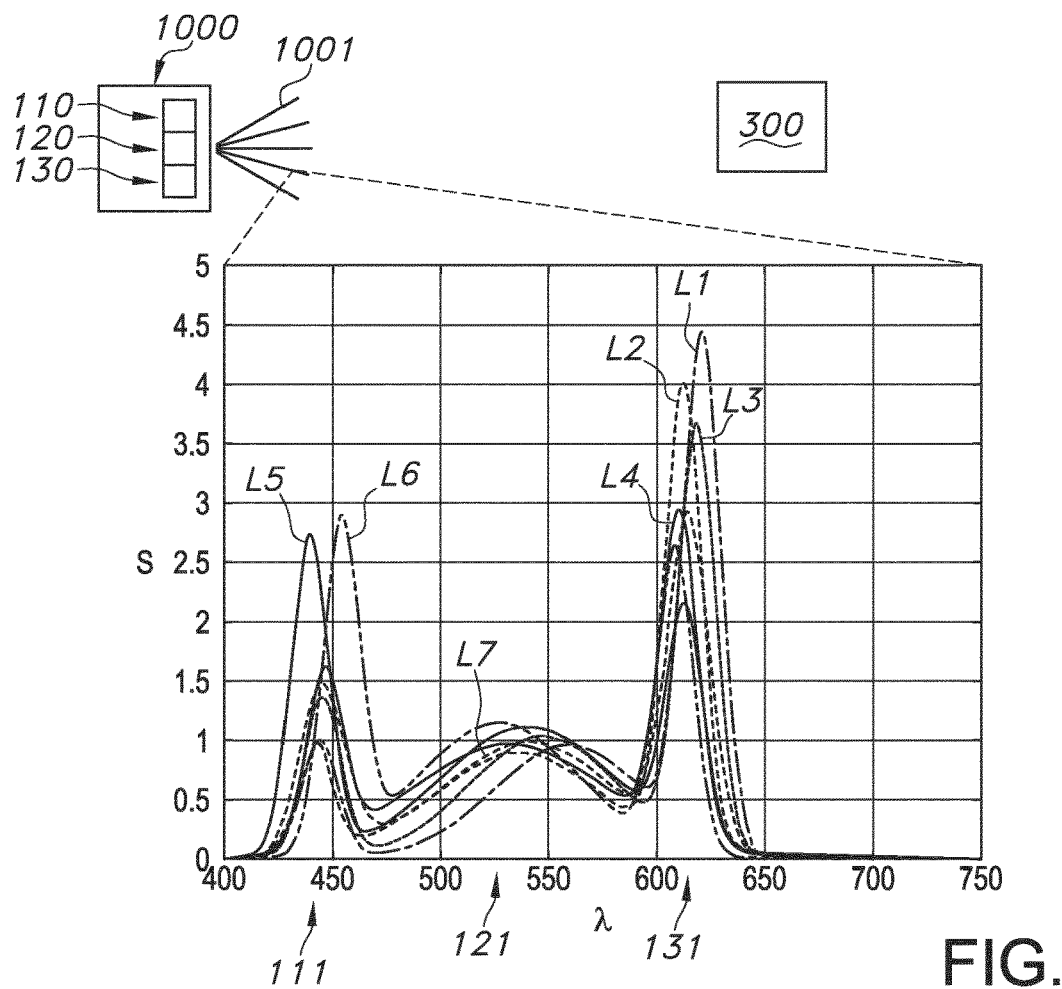
FIGS. 1A-B schematically depict embodiments of the light generating system and the spectral power distributions.

FIG. 1A schematically depicts an embodiment of the light generating system 1000. The light generating system is configured to generate, in a first operational mode (of the light generating system 1000), system light 1001. FIG. 1A further schematically depicts a spectral power distribution of the system light 1001 with relative spectral power S (in a.u.) versus wavelength λ (in nm). In particular, FIG. 1A schematically depicts seven spectra obtained from computational optimization at 6 different CCT values at CRI 70. The optimization performed concerned a selection of the emission bands for a maximization of the color gamut (the area enclosed by the u',v' chromaticities of 85 test-color samples) rendered at radiant fluxes of 30 lux and lower, while maintaining the spectrum color point within the same ANSI bin as that of a reference spectrum at predetermined CCT. The reference spectrum was a commercially available light source spectrum for outdoor applications. In addition, the luminous efficacy of radiation (LER) for the spectrum was required to have a value equal to or larger than 98% of the LER value of the reference spectrum. The optimization was performed using a color appearance model for predicting/simulating the chromaticities of the test colors under the mesopic illumination levels. The model specifically addresses the change in color appearance at low light levels, as described in Shin, J et al., "*A color appearance model applicable in mesopic vision*", 2004, Optical review, 11 (4), 272-278, which is hereby herein incorporated by reference. The optimization was limited to the use of currently available (LED) light source spectra with: Blue FWHM: 20, Green FWHM: 80-120, Red FWHM: 20, Blue PWL: 420-510, Green PWL: 490-610, Red PWL: 585-750. Further the optimization concerned a performance evaluation using a FM100-sample set (with 85 test-color samples).

Specifically, the different depicted lines correspond to different CCT values at CRI=70, wherein L1 corresponds to 2200 K, L2 corresponds to 2700 K, L3 corresponds to 3000 K, L4 corresponds to 4000 K, L5 corresponds to 5700 K, L6 corresponds to 6500 K, and L7 corresponds to an average spectrum (of L1-L6).

Figure 1B:
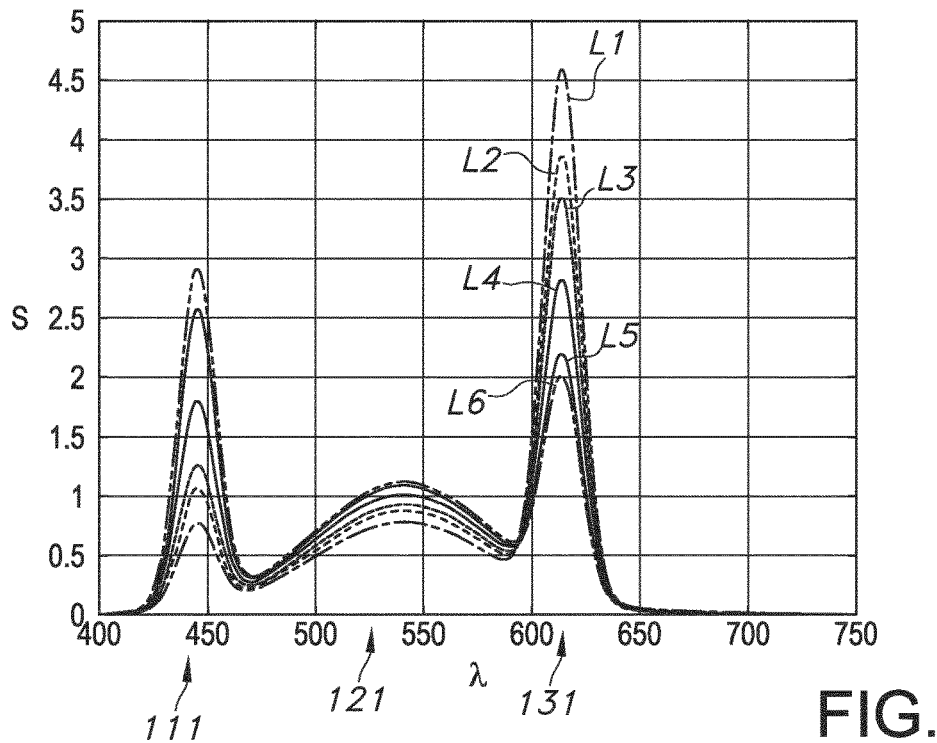

FIG. 1B schematically depicts alternative spectral power distributions of the system light 1001 with relative spectral power S versus wavelength λ (in nm). wherein L1-L6 are centered to an averaged peak wavelength. The vertical hyphened lines schematically depict a rough separation of the three emission bands 111, 121, 131.

In embodiments, the light generating system 1000 may especially comprise three sources of light 110,120,130 configured to generate the emission bands 111, 121, 131. Especially, a first source of light 110 may be configured to generate (at least part of) the first emission band 111, a second source of light 120 may be configured to generate (at least part of) the second emission band 121, and/or a third source of light 130 may be configured to generate (at least part of) the third emission band 131. In embodiments, the three sources of light 110,120,130 may be configured to provide at least 85% of the spectral power of the system light 1001 (in the visible range), especially in the first operational mode, or especially in the second operational mode.

In further embodiments, the first source of light 110 and the third source of light 130 may each be individually selected from the group of laser light sources, superluminescent diodes, and quantum structure based light sources.

In further embodiments, the second source of light 120 may comprise a phosphor converted solid state light source configured to generate the second emission band 121.

In the depicted embodiments, the light generating system 1000 further comprises a control system 300. The control system 300 may especially be configured to control one or more of the spectral power distribution, the color rendering index, the color point 1010, and the correlated color temperature of the system light 1001, especially while maintaining the correlated color temperature within a range of 2200-6500 K.

In further embodiments, the control system 300 may be configured to control one or more of the spectral power distribution, the color rendering index, the color point 1010, and the correlated color temperature of the system light 1001, especially in dependence of one or more of (i) a sensor signal of a sensor 310, such as wherein the sensor 310 comprises an optical sensor, (ii) an input signal of a user interface, and (iii) a timer.

In embodiments, the system light 1001, in the first operational mode, has a spectral power distribution with at least 85% of the spectral power in three emission bands 111,121, 131. The three emission bands especially comprise (i) a first emission band 111 having a centroid wavelength of 445 nm +/−25 nm and having a full width half maximum of at maximum 25 nm, (ii) a second emission band 121 having a centroid wavelength of 541 nm +/−25 nm and having a full width half maximum of at maximum 150 nm, and (iii) a third emission band 131 having a centroid wavelength of 614 nm +/−25 nm and having a full width half maximum of at maximum 25 nm.

In specific embodiments, the first wavelength range may comprise a first emission band 111 having a centroid wavelength of 445 nm +/−5 nm and having a full width half maximum of at maximum 20 nm, and the third wavelength range may comprise a third emission band 131 having a centroid wavelength of 614 nm +/−5 nm and having a full width half maximum of at maximum 20 nm.

In further embodiments, in the first operational mode, the light generating system 1000 is configured to control the spectral power distribution of the system light 1001 in dependence of a radiant flux of the system light 1001 while maintaining a correlated color temperature of the system light 1001 within +/−10%, especially with +/−3%, of a predetermined correlated color temperature value.

In further embodiments, in the first operational mode, the light generating system 1000 may be configured to shift a color point 1010 (also see FIG. 2) of the system light 1001 towards a lower Duv with decreasing radiant flux of the system light 1001, or to shift the color point 1010 of the system light 1001 towards a higher Duv with increasing radiant flux of the system light 1001.

In embodiments, in the first operational mode, the light generating system 1000 may be configured to control the spectral power distribution of the system light 1001 in dependence of the radiant flux of the system light 1001 while maintaining the correlated color temperature of the system light 1001 within a color area defined by (a) the four corners for a 7-step quadrangle in the basic specification and (b) the four corners for a (corresponding) 7-step quadrangle in the extended specification for the predetermined correlated color temperature, especially wherein the 7-step quadrangles and the predetermined correlated color temperature are defined according to ANSI C78.377-2017 Tables 1 & A1 for the basic specification and Tables 2 & E1 for the extended specification.

Figure 2:
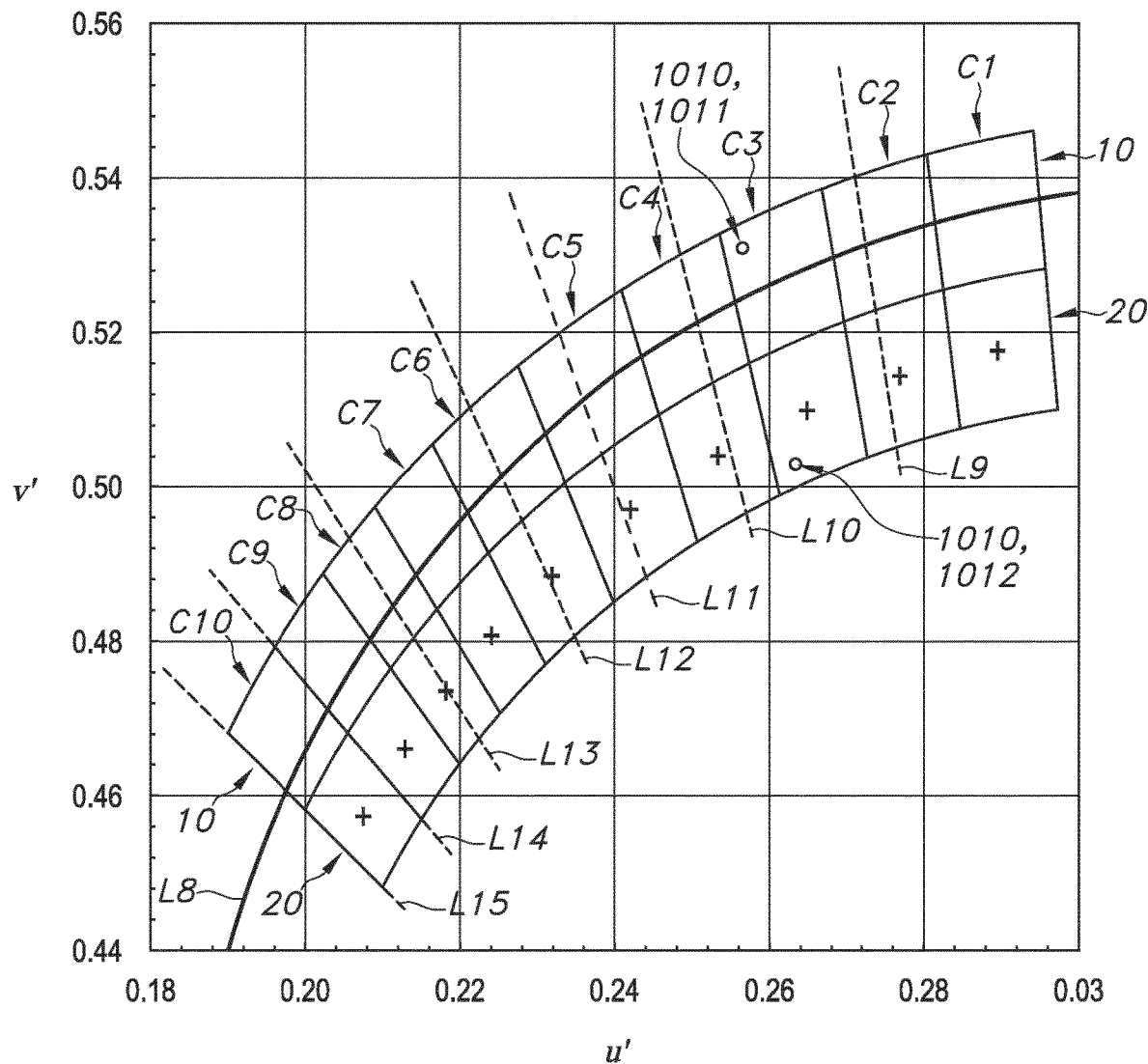
FIG. 2 schematically depicts the basic and extended ANSI C78.377-2017 bins.

FIG. 2 schematically depicts 7-step quadrangles in the basic specification and the 7-step quadrangles in the extended specification in the u'-v' space according to ANSI C78.377-2017. Specifically, references 10 and 20 indicate the basic and extended 7-step quadrangles, respectively, and line L8 indicates the black body locus. Each set of basic and corresponding extended 7-step quadrangles correspond to a respective color area. Specifically: C1 indicates color area 2200/012, C2 indicates color area 2500/012, C3 indicates color area 2700/-012, C4 indicates color area 3000/012, C5 indicates color area 3500/012, C6 indicates color area 4000/011, C7 indicates color area 4500/011, C8 indicates color area 5000/010, C9 indicates color area 5700/010, C10 indicates color area 6500/009. Further, line L9 corresponds to 2500 K, line L10 corresponds to 3000 K, line L11 corresponds to 3500 K, line L12 corresponds to 4000 K, line L13 corresponds to 5000 K, line L14 corresponds to 6000 K, and line L15 corresponds to 7000 K.

FIG. 2 further schematically depicts that, in the first operational mode, the light generating system 1000 may be configured to shift a color point 1010 of the system light 1001 and to change the radiant flux of the system light 1001 between a first setting and a second setting, especially from the first setting to the second setting, or especially from the second setting to the first setting. In the first setting the system light 1001 may especially have a first color point 1011 within the four corners of the 7-step quadrangle in the basic specification for the predetermined correlated color temperature and a first radiant flux I1. In the second setting, the system light 1001 may especially have a second color point 1012 of within the four corners of the (corresponding) 7-step quadrangle in the extended specification for the predetermined correlated color temperature and a second radiant flux I2. In further embodiments, $0.2 \leq I2/I1 \leq 0.95$, such as $0.24 \leq I2/I1 \leq 0.9$.

The light generating system 1000 of the invention may, in embodiments, be configured to provide system light at various predetermined correlated color temperatures. In particular, in embodiments, the correlated color temperature of the system light 1001 may be controllable within the range of 2200-6500 K. In further embodiments, in the first operational mode the light generating system 1000 may be configured to select the predetermined correlated color temperature of the system light 1001 from the range of 2000-6700 K. especially from the range of 2200-4000 K.

Figure 3A:
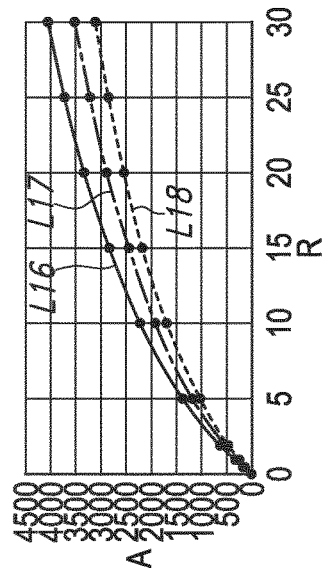
FIG. 3A-F schematically depict simulated results.
Figure 3C:
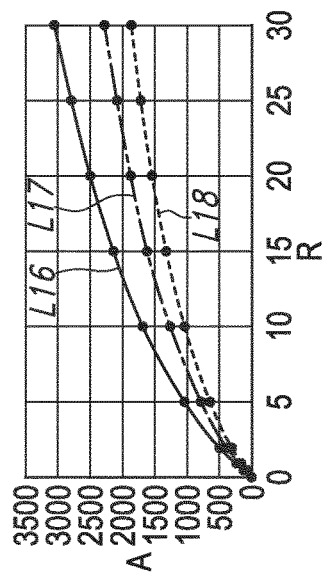
Figure 3E:
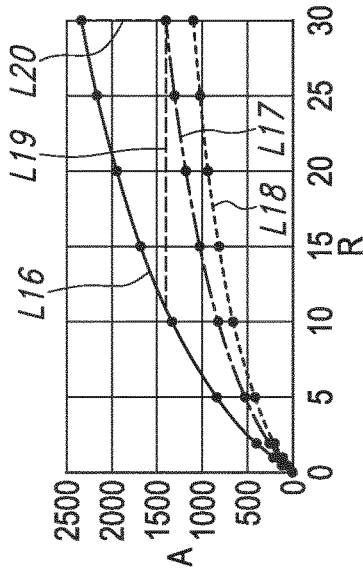
Figure 3B:
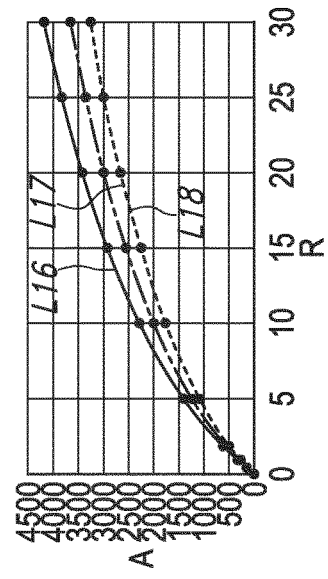
Figure 3D:
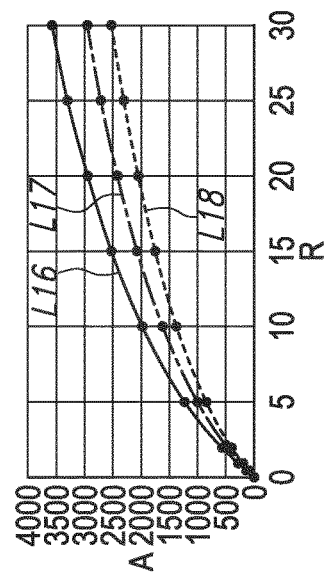
Figure 3F:
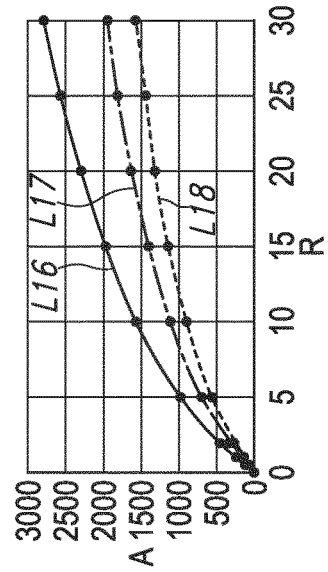

FIG. 3A-F schematically depict simulated results of the observed FM100 chromaticity area A (in a.u.) with respect to the radiant flux R (in lx). In particular, FIG. 3A corresponds to a CCT of 2200 K. FIG. 3B corresponds to a CCT of 2700 K, FIG. 3C corresponds to a CCT of 3000 K. FIG. 3D corresponds to a CCT of 4000 K, FIG. 3E corresponds to a CCT of 5700 K, FIG. 3F corresponds to a CCT of 6500 K. Specifically line L16 corresponds to the bottom of the respective (extended) ANSI bin, whereas line L17 corresponds to the top of the respective (basic) ANSI bin. Line L18 corresponds to a spectral power distribution at CRI=70 (and the same CCT).

FIG. 3A-F may further illustrate that the benefit of the color point shift may depend on the CCT: a larger improvement may be obtained at a lower CCT. Hence, in embodiments, the predetermined CCT may be $\leq 4000$ K, especially $\leq 3500$ K, such as $\leq 3000$ K.

Hence, as schematically depicted in FIG. 3A, the light generating system 1000 of the invention may, in the first operational mode, facilitate maintaining the same observed FM100 area for a radiant flux of about 10 lx to about 30 lx, as indicated by hyphened line L19.

Similarly, the light generating system 1000 of the invention may facilitate, in a second operational mode, increasing the observed FM100 area at a given radiant flux, such as increasing the observed FM100 area from about 1400 to about 2300 at a radiant flux of 30 lx, as indicated by hyphened line L20.

Hence, in embodiments, the light generating system 1000, especially the control system 300, may have a second operational mode. In the second operational mode the light generating system 1000 may be configured to shift a color point 1010 of the system light 1001 between a first setting and a second setting, while keeping the radiant flux of the system (essentially) constant. In embodiments, in the second operational mode, the light generating system 1000 may be configured to shift the color point 1010 from (i) a first setting with a first color point 1011 of the system light 1001 within the four corners of the 7-step quadrangle in the basic specification for the predetermined correlated color temperature according to ANSI C78.377-2017 (also see FIG. 2) and a first radiant flux I1, to (ii) a second setting with a second color point 1012 of the system light 1001 within the four corners of the 7-step quadrangle in the extended specification for the predetermined correlated color temperature according to ANSI C78.377-2017 and a second radiant flux I2, or from the second setting to the first setting. In further embodiments, $0.90 \leq I2/I1 \leq 1.00$, especially $0.95 \leq I2/I1 \leq 1.05$, such as $0.97 \leq I2/I1 \leq 1.03$.

Figure 4A:
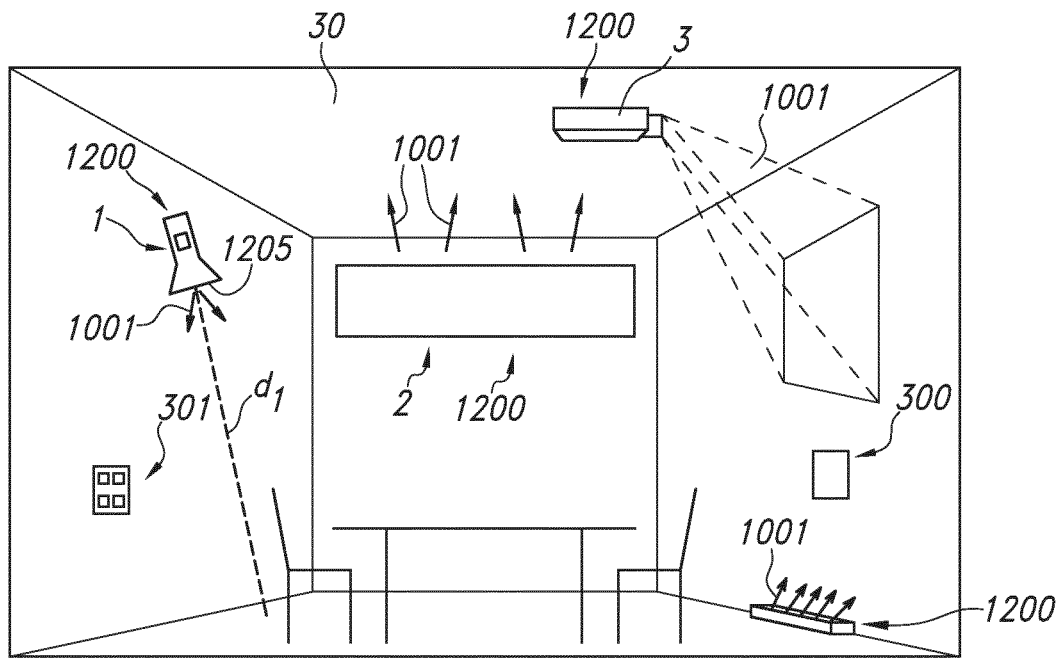
FIG. 4A-B schematically depict embodiments of the light generating device.
Figure 4B:
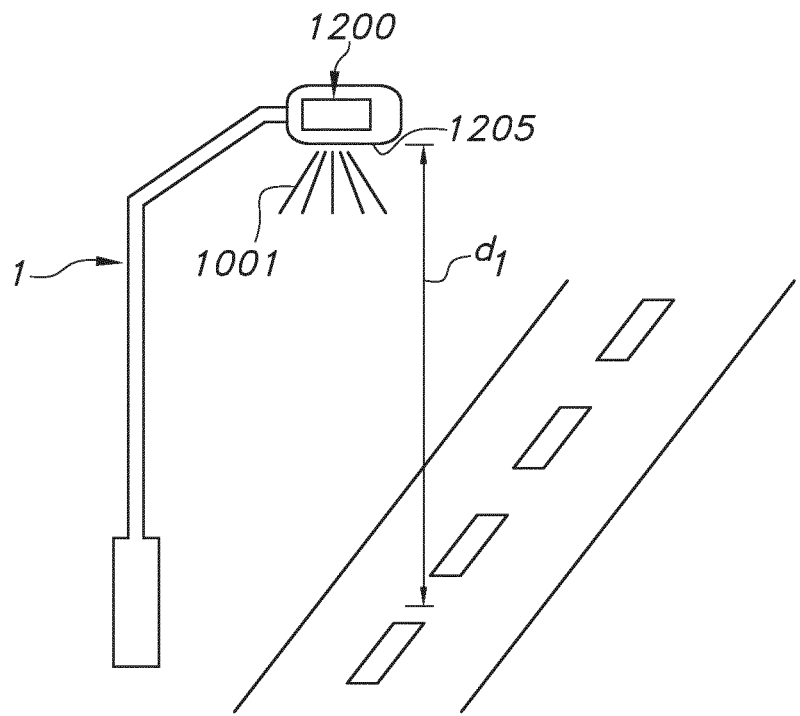

FIG. 4A-B schematically depict embodiments of the light generating device 1200 according to the invention. The light generating device may especially comprise the light generating system according to the invention. In embodiments, the light generating device may be selected from the group of a lamp 1 and a luminaire 2.

FIG. 4A schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of a lamp 1 comprising the light generating system 1000. Reference 3 indicates a projector device or projector system, which may be used to project images, such as at a wall, which may also comprise the light generating system 1000. Hence, FIG. 3 schematically depicts embodiments of a light generating device 1200 selected from the group of a lamp 1, a luminaire 2, a projector device 3, comprising the light generating system 1000.

In the depicted embodiment, the light generating device 1200 may comprise an indoor light generating device, wherein the light generating device 1200 is configured to generate in an operational mode an illuminance selected from an illuminance range of 5-50 lux, such as from the range of 8-40 lux, at a predetermined distance d1 of a light emitting surface 1205 of the light generating device 1200. In embodiments, the predetermined distance d1 may be selected from the range of 2-15 m, such as from the range of 2-12 m, especially from the range of 2-11 m. In further embodiments, the predetermined distance d1 may be selected from the range of 2.0-11 m, such as from the range of 3-6 m.

FIG. 4B schematically depicts an embodiment of a lamp 1 comprising the light generating system 1000, especially of a street light (or "street lantern"). In particular, in the depicted embodiment, the light generating device 1200 may comprise a street light generating device, wherein the light generating device 1200 is configured to generate in an operational mode an illuminance selected from an illuminance range of 3-30 lux, such as from the illuminance range of 4-25 lux, at a predetermined distance d1 of a light emitting surface 1205 of the light generating device 1200. In embodiments, the predetermined distance d1 may be selected from the range of 2.5-20 m, especially from the range of 2.5-16 m, such as from the range of 3.5-16 m. In further embodiments, the predetermined distance d1 may be selected from the range of 3.6-16 m, especially from the range of 6-8 m.

In further embodiments, the illuminance may be controllable over at least part of the illuminance range.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system configured to generate system light in a first operational mode, wherein in the first operational mode:
the system light has a spectral power distribution with at least 85% of the spectral power in three emission bands comprising (i) a first emission band having a centroid wavelength of 445 nm +/−25 nm and having a full width half maximum of at maximum 25 nm, (ii) a second emission band having a centroid wavelength of 541 nm +/−25 nm and having a full width half maximum of at maximum 150 nm, and (iii) a third emission band having a centroid wavelength of 614 nm +/−25 nm and having a full width half maximum of at maximum 25 nm;
the light generating system is configured to control the spectral power distribution of the system light in dependence of a radiant flux of the system light while maintaining a correlated color temperature of the system light within +/−10% of a predetermined correlated color temperature value;
the light generating system is configured to shift a color point of the system light towards a lower $D_{uv}$ when decreasing the radiant flux of the system light or to shift the color point of the system light towards a higher Duv when increasing the radiant flux of the system light;
the light generating system is configured to generate an illuminance selected from an illuminance range of at most 50 lux at a predetermined distance of a light emitting surface of the light generating system, wherein the predetermined distance is selected from the range of at most 20 m, and
the system light comprising white light having a correlated color temperature in the range of 1800-6500 K.

2. The light generating system according to claim 1, wherein in the first operational mode the light generating system is configured to control the spectral power distribution of the system light in dependence of the radiant flux of the system light while maintaining the correlated color temperature of the system light within a color area defined by (a) the four corners for a 7-step quadrangle in the basic specification and/or (b) the four corners for a 7-step quadrangle in the extended specification for the predetermined correlated color temperature, wherein the 7-step quadrangles and the predetermined correlated color temperature are defined according to ANSI C78.377-2017 Tables 1 & A1 for the basic specification and Tables 2 & E1 for the extended specification.

3. The light generating system according to claim 2, wherein in the first operational mode the light generating system is configured to shift a color point of the system light and to change the radiant flux of the system light from (i) a first setting with a first color point of the system light within the four corners of the 7-step quadrangle in the basic specification for the predetermined correlated color temperature and a first radiant flux I1, to (ii) a second setting with a second color point of the system light within the four corners of the 7-step quadrangle in the extended specification for the predetermined correlated color temperature and a second radiant flux I2, wherein $0.24 \leq I2/I1 \leq 0.9$, or from the second setting to the first setting.

4. The light generating system according to claim 1 wherein in the first operational mode the light generating system is configured to maintain the color rendering index of the system light of at least 70.

5. The light generating system according to claim 1, wherein in a second operational mode the light generating system is configured to shift a color point of the system light from (i) a first setting with a first color point of the system light within the four corners of the 7-step quadrangle in the basic specification for the predetermined correlated color temperature according to ANSI C78.377-2017 and a first radiant flux I1, to (ii) a second setting with a second color point of the system light within the four corners of the 7-step quadrangle in the extended specification for the predetermined correlated color temperature according to ANSI C78.377-2017 and a second radiant flux I2, or from the second setting to the first setting, wherein $0.95 \leq I2/I1 \leq 1.05$.

6. The light generating system according to claim 1, wherein the correlated color temperature of the system light is controllable within the range of 2200-6500 K.

7. The light generating system according to claim 1, wherein in the first operational mode the light generating system is configured to select the predetermined correlated color temperature of the system light from the range of 2200-4000 K.

8. The light generating system according to claim 1, wherein in the first operational mode the light generating system is configured to maintain the correlated color temperature of the system light (1001) within +/−3% of a predetermined correlated color temperature value.

9. The light generating system according to claim 1, wherein the first wavelength range comprises a first emission band having a centroid wavelength of 445 nm +/−5 nm and having a full width half maximum of at maximum 20 nm, and wherein the third wavelength range comprises a third emission band having a centroid wavelength of 614 nm +/−5 nm and having a full width half maximum of at maximum 20 nm.

10. The light generating system according to claim 1, comprising three sources of light configured to generate the emission bands, wherein a first source of light is configured to generate at least part of the first emission band, a second source of light is configured to generate at least part of the second emission band, and a third source of light is configured to generate at least part of the third emission band.

11. The light generating system according claim 10, wherein the first source of light and the third source of light are each individually selected from the group of laser light sources, superluminescent diodes, and quantum structure based light sources;

and wherein the second source of light comprises a phosphor converted solid state light source configured to generate the second emission band.

12. The light generating system according to claim 1, further comprising a control system configured to control one or more of the spectral power distribution, the color rendering index, the color point, and the correlated color temperature of the system light in dependence of one or more of (i) a sensor signal of a sensor, wherein the sensor comprises an optical sensor, (ii) an input signal of a user interface, and (iii) a timer.

13. A light generating device selected from the group of a lamp (1) and a luminaire (2), comprising the light generating system according to claim 1.

14. The light generating device according to claim 13, wherein the light generating device comprises a street light generating device, wherein the light generating device is configured to generate in an operational mode an illuminance selected from an illuminance range of 3-30 lux at a predetermined distance of a light emitting surface of the light generating device, wherein the predetermined distance is selected from the range of 3.5-16 m, and wherein the illuminance is controllable over at least part of the illuminance range.

15. The light generating device according to claim 13, wherein the light generating device comprises an indoor light generating device, wherein the light generating device is configured to generate in an operational mode an illuminance selected from an illuminance range of 5-50 lux at a predetermined distance of a light emitting surface of the light generating device, wherein the predetermined distance is selected from the range of 2.0-11 m, and wherein the illuminance is controllable over at least part of the illuminance range.

* * * * *